United States Patent [19]

Nelson

[11] 3,966,100

[45] June 29, 1976

[54] LOCK FOR COATS AND OTHER SLEEVED GARMENTS

[75] Inventor: Daryl A. Nelson, Sioux Falls, S. Dak.

[73] Assignee: The Raymond Lee Organization, Inc., a part interest

[22] Filed: June 16, 1975

[21] Appl. No.: 586,975

[52] U.S. Cl. .......... 223/92; 211/4; 223/94

[51] Int. Cl.$^2$ .......... A47J 51/10; E05B 73/00

[58] Field of Search .......... 223/92, 93, 94, 88, 223/85; 211/113, 119, 4; 242/107; 248/340

[56] References Cited

UNITED STATES PATENTS

| | | | |
|---|---|---|---|
| 1,620,590 | 3/1927 | Betts | 242/107 R |
| 1,713,621 | 5/1929 | Price | 223/92 |
| 3,219,241 | 11/1965 | Newton | 223/94 |
| 3,378,144 | 4/1968 | Webster | 211/4 |
| 3,568,479 | 3/1971 | Fleck et al. | 211/4 |
| 3,885,674 | 5/1975 | Rosenberg et al. | 211/4 |

*Primary Examiner*—George H. Krizmanich

[57] ABSTRACT

A clothing hanger member of conventional shape has symmetrical right and left sides, each with its own end. Reel means is attached to the left end of the member and reels flexible cable into the reel means when the cable is not under tension. The free end of the cable is fitted with lock means that locks the cable into a loop and simultaneously locks a hanger means around a clothes bar to prevent theft. When the cable is passed through the sleeve of a sleeved garment and locked into a loop, the garment cannot be removed from the device without being cut, and the device cannot be removed from the bar, without interlocking the lock means.

4 Claims, 2 Drawing Figures

LOCK FOR COATS AND OTHER SLEEVED GARMENTS

SUMMARY OF THE INVENTION

This invention is designed to lock garments to the clothes bars upon which such garments are conventionally hung after being placed on hangers.

A major feature of the invention resides in the use of a flexible cable that can be passed through the sleeve of a sleeved garment such as a coat. The cable can then be locked into a loop, secured to a hanger member upon which the garment is hung. The hanger member is detachably secured to a clothes bar by hanger means.

DETAILED DESCRIPTION OF PREFERRED EMBODIMENTS

Figure 1:
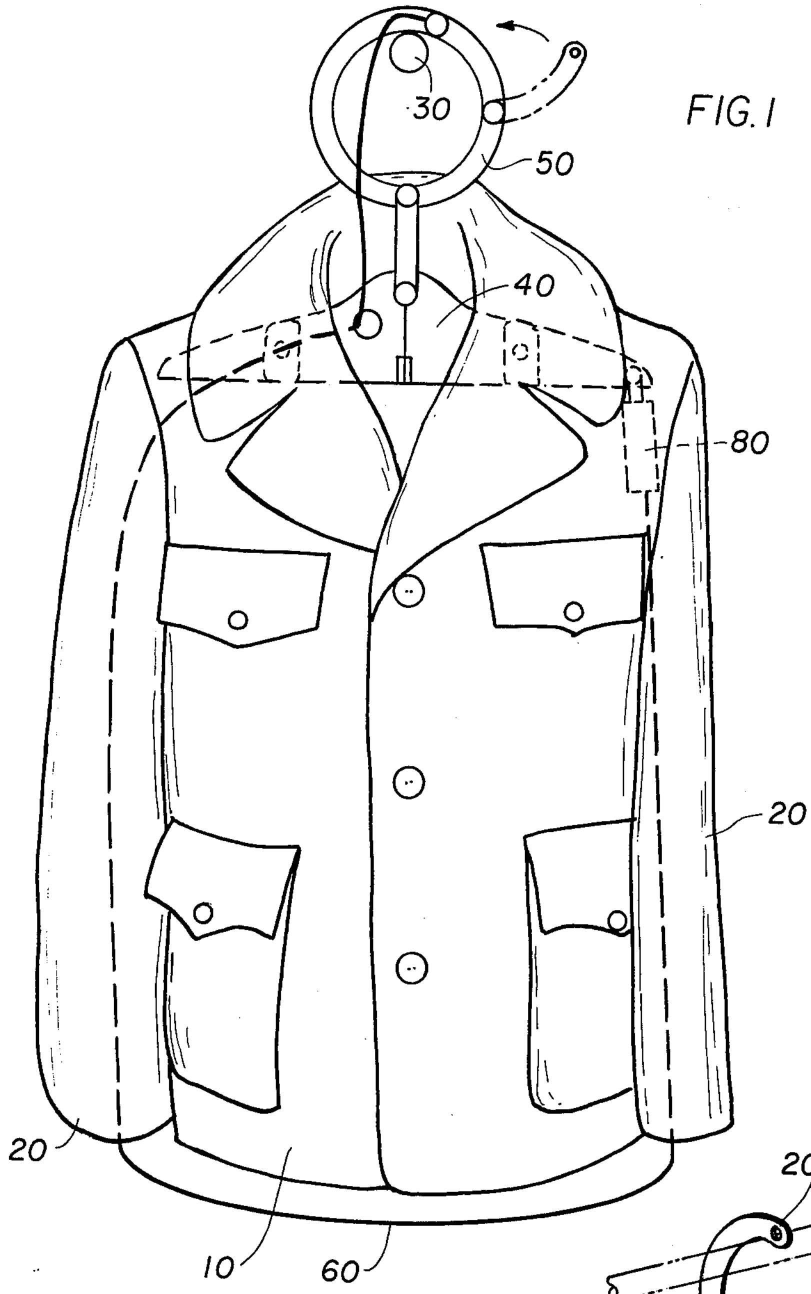
FIG. 1 shows the invention in use.
Figure 2:
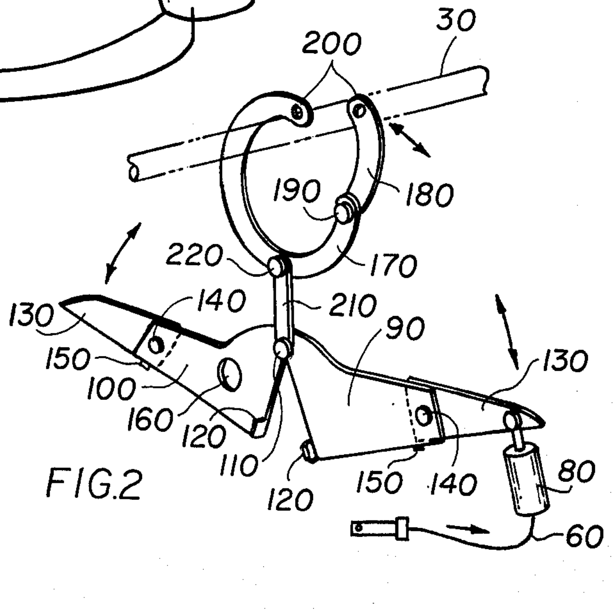
FIG. 2 shows a perspective drawing of the invention.

A coat 10 with two sleeves 20 is to be hung from an elongated horizontal clothes bar 30 such as is conventionally used in closets. The coat is hung upon a hanger member indicated generally by 40 that is detachably secured to the bar by hanger means indicated generally by 50.

The hanger means, as will later be described in more detail, can encircle the bar to detachably secure the member to it. A cable 60 with one end fixed to the hanger means and hanger member is passed through the sleeves and locked into a loop by lock means 70. The garment may thus not be removed without cutting the garment or severing the cable.

A reel means 80, which is pivotally attached at one end to the left end of the hanger member, can retract the cable into the housing of the reel means, whenever the cable is not under tension, eliminating slack in the cable. Means 80 is a conventional unit having a hollow housing with a freely rotatable drum or reel therein. The cable is wound on the drum with one end secured to the drum. A spring maintains the cable automatically wound up on the drum except when the other end of the cable is pulled out against the bias of the spring. As soon as the cable is released, it is wound up by spring action.

The hanger member has symmetrical left and right halves 90 and 100 respectively, and these halves may be folded towards and away from each other on pivot 110. Flanges 120 on the halves extend outwardly from the halves at right angles, to serve as stops which prevent the halves from being rotated past the point at which the stops 120 are in abutment. End members 130 on each half similarly pivot on pins 140, to be limited in their rotation by flanges 150.

To make the device more convenient to use, a hole 160 is placed in the right half, so that the cable may be more easily drawn up to the hanger means through the collar of the coat.

The hanger means itself has an L-shaped member 170 with a curved member 180 that is pivotally secured to one end of member 170 by pivot 190. This curved member forms a closed circle when its free end is aligned with the free end of member 170. In use, the lock means is inserted through holes 200 in the free ends of members 170 and 180, to secure the hanger means around the bar in a circle. The hanger means supports pivot 110 (and thus the hanger member) by arm 210 that is attached to member 170 by pivot 220.

The hanger member is made with a conventional shape to avoid deforming garments hung upon it.

Although the invention has been described with particular reference to the drawings, the protection sought is to be limited only by the terms of the claims which follow.

What is claimed is:

1. A coat lock, comprising:

a clothing hanger member which is elongated and has opposed pair of ends;

hanger means with two curved members that each have a free end, the hanger means being attached to the top of the hanger member intermediate its ends to enable the hanger means to be secured to a clothes bar when the free ends of the members are secured together and to enable the hanger means to be detached from the clothes bar when the free ends of the members are separated from each other;

a flexible cable secured at one end to an end of the hanger member; and lock means attached to the end of the cable remote from the hanger member and detachably securing this remote end to the free ends of the curved members to form a closed loop while simultaneously securing the free ends of the members together.

2. The device of claim 1, wherein a reel means for retracting the cable into a housing when the cable is not under tension is attached to one of the end of the hanger member and to the fixed end of the cable.

3. The device of claim 2 wherein the hanger member is foldable.

4. The device of claim 3 wherein the hanger member has a left half and a symmetrical right half, wherein the reel means is secured to the end of the left half, and wherein the right half bears a hole through which the free end of the cable can pass prior to attaching to the hanger means, whereby a coat or other sleeved garment can be hung upon the hanger member and the cable looped through at least one sleeve and then attached to the hanger means to form a loop.

* * * * *